(12) United States Patent
Ding

(10) Patent No.: US 9,626,074 B2
(45) Date of Patent: Apr. 18, 2017

(54) TOUCH SCREEN UNLOCKING METHOD AND DEVICE

(71) Applicant: HUIZHOU TCL MOBILE COMMUNICATION CO., LTD., Huizhou (CN)

(72) Inventor: Yang Ding, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 458 days.

(21) Appl. No.: 14/124,082

(22) PCT Filed: Oct. 8, 2012

(86) PCT No.: PCT/CN2012/082593
§ 371 (c)(1),
(2) Date: Dec. 5, 2013

(87) PCT Pub. No.: WO2013/097511
PCT Pub. Date: Jul. 4, 2013

(65) Prior Publication Data
US 2014/0137045 A1 May 15, 2014

(30) Foreign Application Priority Data
Dec. 28, 2011 (CN) .......................... 2011 1 0447241

(51) Int. Cl.
*G06F 3/0481* (2013.01)
*G06F 3/0488* (2013.01)
*G06F 21/36* (2013.01)
*G06F 21/31* (2013.01)
*H04M 1/67* (2006.01)
*H04W 12/06* (2009.01)
*H04M 1/725* (2006.01)

(52) U.S. Cl.
CPC ........ *G06F 3/04817* (2013.01); *G06F 3/0488* (2013.01); *G06F 3/04883* (2013.01); *G06F 3/04886* (2013.01); *G06F 21/36* (2013.01); *G06F 21/31* (2013.01); *H04M 1/67* (2013.01); *H04M 1/72544* (2013.01); *H04W 12/06* (2013.01)

(58) Field of Classification Search
CPC .... G06F 3/04817; G06F 3/0488; G06F 21/31; G06F 21/36; H04M 1/67; H04W 12/06
USPC ........................................................ 715/835
See application file for complete search history.

(56) References Cited

U.S. PATENT DOCUMENTS

| 2008/0307364 | A1* | 12/2008 | Chaudhri | G06F 3/0483 715/836 |
|---|---|---|---|---|
| 2010/0138786 | A1* | 6/2010 | McQueen | G08C 17/02 715/810 |
| 2013/0298024 | A1* | 11/2013 | Rhee | G06F 3/0488 715/716 |

FOREIGN PATENT DOCUMENTS

CN        102270097 A  * 12/2011 ........... G06F 3/0488

* cited by examiner

*Primary Examiner* — Ajay Bhatia
*Assistant Examiner* — Mong-Shune Chung
(74) *Attorney, Agent, or Firm* — Shimokaji IP

(57) ABSTRACT

A touch screen unlocking method comprises displaying a plurality of icons on an unlocking interface, among which at least two icons can be arranged to match with each other; after a user taps one of the matched icons, amplifying and displaying the other icon; when the user taps the amplified and displayed icon area, unlocking the touch screen. According to the present invention, the frequency of mistakes by the user can be reduced, and the user experience can be improved.

16 Claims, 3 Drawing Sheets

TOUCH SCREEN UNLOCKING METHOD AND DEVICE

TECHNICAL FIELD

The present invention relates to a touch screen method and device, and in particular, relates to a touch screen unlocking method and device.

BACKGROUND

Touch screen devices are mainstream electronic products in the prior art, having a rich variety of unlocking methods, which may basically utilize a way of slide-to-unlock, such as sliding from left to right or from right to left in a straight line, or drawing a multi-point connecting line, or lining out an icon from a designated area. All these methods belong within the scope of slide-to-unlock.

Slide-to-unlock has its drawbacks due to the fact that a device may not determine a sliding path correctly, for instance, it may be hard to control the length of a sliding path or the force exerted on the sliding path. There appears to be no technical solution in the prior art using two-point touches to unlock a screen; therefore, there is much room for the prior art to be improved and developed.

SUMMARY OF THE INVENTION

An object of the present invention is to provide a touch screen unlocking method and device, to provide an unlocking operation method not in a slide-to-unlock way, so as to achieve a more accurate unlocking operation, and reduce poor user experience caused by mistakes.

A technical solution of the present invention is as below:

A touch screen unlocking method may comprise the steps as follows: A. displaying a plurality of icons on an unlocking interface, among which at least two icons are arranged to match each other; B. waiting for a user to tap one of the matched icons; C. magnifying and displaying a corresponding icon after the user taps an icon, and waiting for a second tap operation from the user; D. unlocking the touch screen when the user performs a second tap operation in an area of the amplified and displayed icon; said step A further comprises the steps of: arranging for all icons to match in pairs; and distributing said icons randomly on the unlocking interface.

In said method, in step C, the time of waiting for the second tap operation from the user may be set as 10 seconds, 20 seconds or 30 seconds.

In said method, the icons in step A may be ones predefined by a system, or customized by a user.

In said method, the step C may further comprise the step of: highlighting another icon that matches the icon.

In said method, the step C may further comprise the step of: determining and magnifying an icon in the list that matches an icon that is tapped by the user.

In said method, the step C may further comprise the step of: reading information such as location and state of an icon from a configuration list in which the information may include a serial number of an icon, location of the icon, state of the icon and a serial number of an icon that matches the icon. The information may be stored and the icon may be displayed on the screen by an unlocking program.

In said method, the step C may further comprise the step of: finding the icon in the configuration list, looking up information of an icon that matches the icon, and magnifying the matching icon by the unlocking program after an icon is tapped by the user; and using a magnified area as an area that may receive an effective tap.

In said method, the step C may further comprise the step of: when adding new icons onto a lock screen interface, adding two matching icons at the same time onto the lock screen interface. Information of the added icons may be stored in the configuration list. When deleting icons, two matching icons may be deleted together, and the deleted icons may be deleted from the configuration list. The added icons or the deleted icons may comprise matching icons.

In said method, the step C may further comprise the step of: arranging application icons onto the unlocking interface, randomly setting the matching icons for unlocking on the unlocking interface, and starting a predefined function or application corresponding to the icons when the two tapped icons match each other.

In said method, the step D may further comprise the step of: performing unlocking and clearing recorded user tapping records by a touch screen device.

A touch screen unlocking method may comprise the steps of:

A. displaying a plurality of icons on an unlocking interface, among which at least two icons are arranged to match each other;

B. waiting for a user to tap one of the matched icons;

C. magnifying and displaying the other icon after the user taps an icon, and waiting for a second tap operation from the user;

D. unlocking the touch screen when the second tap operation in an area of the amplified and displayed icon is received from the user.

In said method, all icons in step A may be arranged to match in pairs.

In said method, the icons in step A may be distributed randomly on the unlocking interface.

In said method, in step C the time of waiting for the second tap operation from the user may be set as 10 seconds, 20 seconds or 30 seconds.

In said method, the icons in step A may be the ones predefined by a system, or customized by a user.

A touch screen unlocking device using the method may be arranged to include a configuration list storing the information comprising a serial number of an icon, a location of the icon, a state of the icon and a serial number of an icon matching the icon; an unlocking program may, when an icon is tapped by the user, find out the location and the state of an icon matching the icon from the configuration list and magnify the other icon; a magnified area may effectively receive a tap.

In the touch screen unlocking device, an editing operation of a user adding unlocking icons onto a lock screen interface may add two matching icons to the configuration list.

In the touch screen unlocking device, an editing operation of the user deleting unlocking icons on a lock screen interface may delete two matching icons from the configuration list.

A touch screen unlocking method and device provided by the present invention can control an operation area and control accurate operation movements, as well as reduce mistakes to improve user experiences by tapping two points on the touch screen which may be represented as matching two matching icons to conduct unlocking.

DETAILED DESCRIPTION OF THE INVENTION

Embodiments of the present invention will be described in detail below.

The unlocking method in an embodiment of a touch screen unlocking method and device according to the present invention may be similar to a simple game named "LinkGame", which may achieve matching operation by tapping two points on a touch screen to conduct the determination and operation of unlocking or not unlocking.

Figure 1:
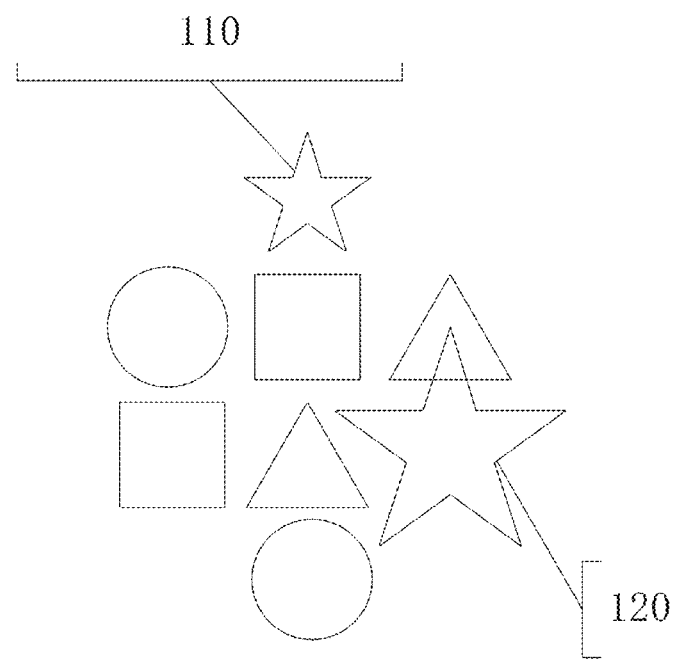
FIG. 1 is a schematic diagram of an embodiment of a touch screen unlocking method and device according to the present invention.

As shown in FIG. 1, a touch screen unlocking method and device of the present invention, may include a lock screen interface of a touch screen device that may be brightened by a tap, there may be a plurality of icons displayed in a random area on the screen, among which each kind of icon may have two matching icons displayed randomly in the area. When one of the two matching icons is tapped by a user, the other matching icon may be treated in a special way such as being magnified and displaced. The device can then be unlocked after the magnified icon is tapped by the user, or a predefined function can be directly started. The plurality of icons may not be limited to a display mode with random distribution but the icons can be preset to fixed locations.

A correlation match between two points on a touch screen can be achieved by clicking two icons in sequence, thus performing unlocking. A matching icon may be magnified on the screen automatically after one of the matching icons is tapped, which can further facilitate the user's unlocking operation, thus improving the user experience.

In an embodiment of a touch screen unlocking method and device of the present invention, after a user taps an icon, he or she may need to find out which icon matches the tapped icon from many icons displayed in a disorganized order. The user may continue to tap the icon to achieve unlocking. It may take a longer time for the user to find out the other matching icon on a screen of a large screen device with too many icons. Accordingly, the time for unlocking the device may increase, which may degrade the user's experience. However, while the user taps an icon, if an icon matching the icon is immediately magnified or displayed in other ways such as but not limited to highlighting, it may be very easy for the user to find an icon that matches the icon and tap it, thus reducing the time for the user to unlock the device.

Prompting a user may not be limited by a touch screen unlocking method and device of the present invention. As shown in FIG. 1, there may be four groups of the matching icons. When a first selected icon 110 "five stars" is tapped by a user, a matching icon 120 may be magnified and displayed immediately by the operation program of the device to reduce the time spent in finding out the target icon by the user.

Figure 2:
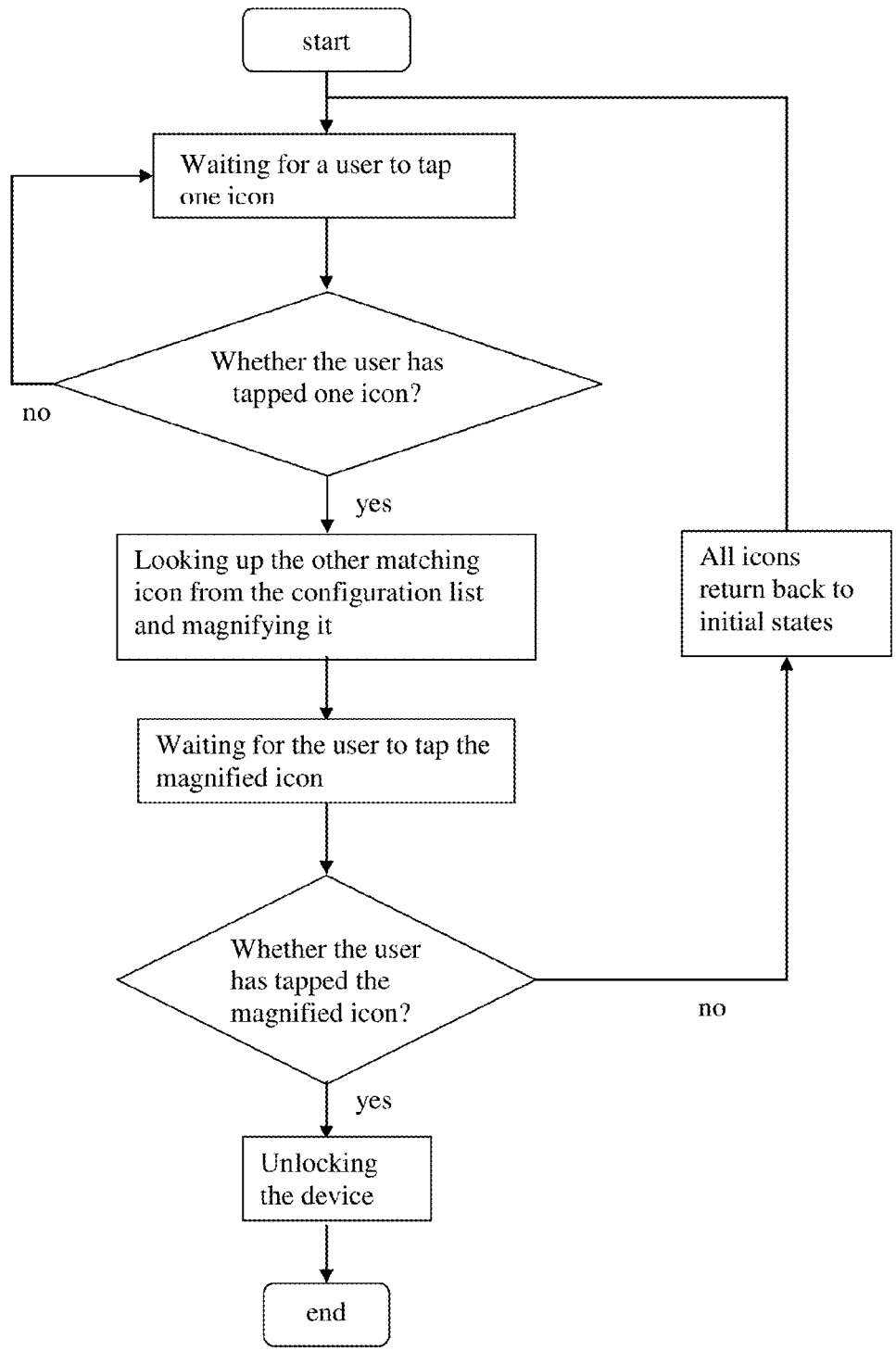
FIG. 2 is a flow chart of a touch screen unlocking method according to the present invention.

Unlocking icons may not be limited by a touch screen unlocking method and device of the present invention as long as it can lead the user to tap two points on a screen in sequence. FIG. 2 shows the processing flow of unlocking by tapping two points according to a method of the present invention, which comprises: providing multiple groups of icons on an unlocking interface, among which at least one group having two matching icons is arranged; waiting for a user to tap one of the two matching icons, and each of the icons can be set as having a matching icon, so that the user can tap any of the icons; determining and magnifying a matching icon in the list after one of the two matching icons is tapped by the user to prompt the user to note the magnified icon, and waiting for further user operation. If the user does not tap the touch screen, after a preset time such as 10 second, 20 seconds or 30 seconds, the state of the unlocking interface may be returned back to its initial state which waits for the user to tap the first selected icon.

If the user performs a proper tap, unlocking the screen and clearing the recorded user tapping records are performed by the touch screen device to close the unlocking process.

Function icons on a lock screen interface can be icons predefined by a system, and may also be icons customized by the user, which may not be specifically limited by the present invention as long as the displayed icons can be identified by the user. In an embodiment of the present invention, the displayed location of an icon may not be limited specifically as long as the user can touch the icon successfully. And the overall displayed shape and sequence of all the function icons may not specifically be limited either. The overall displayed shape of the icons can be in, for instance, a rectangle area or a circular area, and the displayed order of the icons can be in a random or a predefined way.

In a touch screen unlocking device according to the present invention, the information such as a serial number of an icon, location of the icon, state of the icon as well as a serial number of an icon matching the icon may be stored in a configuration list. An unlocking program may read the information such as location, and state of the icon from the configuration list and may display the icon on the screen. When one icon is tapped by a user, the unlocking program may find out the icon from the icon configuration list, look up the information such as location, state of an icon that matches the icon, and magnify the other icon that matches the icon; the entire magnified area can effectively receive a tap from the user.

In an embodiment of the present invention, a user can perform an editing operation to the unlocking icons on a lock screen interface such as adding or deleting icons. When the user adds new icons to the lock screen interface, two matching icons can be added at the same time to the lock screen interface to match each other, and similarly, the deleting operation can delete two matching icons at the same time. The information of the added icons may be stored in the configuration list, the information of the deleted icons may be deleted from the configuration list, and the added icons or the deleted icons may include matching icons. As a number of new functions for icons may be added by the user, the present invention is not specifically limited to a single icon function.

Figure 3:
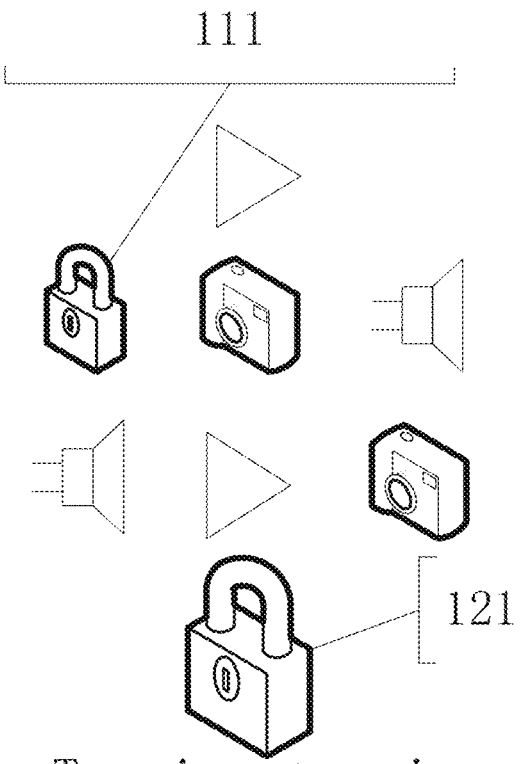
FIG. 3 is a schematic diagram of another embodiment of a touch screen unlocking method and device according to the present invention.

In an embodiment, a touch screen unlocking method and device of the present invention shown in FIG. 3, can extend the function of unlocking by tapping two points. Considering that a user needs to access a corresponding application interface immediately after the lock screen interface, some application icons can be preset on the unlocking interface as quick start applications. Matching icons for unlocking can be set on the unlocking interface randomly, such as a camera icon and a music player icon shown in FIG. 3. The user can select an application expected to correspond to a first selected icon 111, and can perform the second tap after the matching icon 121 is magnified and displayed; when the two icons tapped by the user match each other, the predefined function or application corresponding to the icon is started, and by doing so the user can access the corresponding application interface directly and quickly. The function extension of tapping two points to unlock the screen falls into the protective scope of the present invention.

A touch screen unlocking method and device of the present invention may facilitate a user's operation, increase the user's operation accuracy, and improve user experiences accordingly.

It should be understood that improvements or variations can be made according to the above description by those skilled in the art, and any of these improvements or variations may fall into the protective scope of claims appended to the present invention.

The invention claimed is:

1. A touch screen unlocking method comprising:
reading information from a configuration list, wherein the information includes a serial number of a first one of matched icons and a serial number of a second one of matched icons,
wherein the first one of the matched icons and the second one of the matched icons are visually identical;
displaying after reading the information, a plurality of icons including at least four icons, the plurality of icons including the first one of the matched icons and the second one of the matched icons on an unlocking interface, wherein the plurality of icons are randomly distributed on the unlocking interface and wherein each of the plurality of icons is visually identical to at least one other matched icon in the plurality of icons; and
where each pair of the first and second one of the matched icons is visually distinct from each other and associated with a predefined function;
waiting for a user to tap the first one of the matched icons in a first tap operation;
magnifying the second one of the matched icons after an operation of tapping the first one of the matched icons is received from the user, and waiting for a second tap operation from the user;
unlocking the touch screen and starting the predefined function when the second tap operation in an area of the magnified second one of the matched icons is received from the user.

2. The method according to claim 1, wherein in the step of magnifying the second one of the matched icons, the time of waiting for the second tap operation from the user is set as 10 seconds, 20 seconds or 30 seconds.

3. The method according to claim 1, wherein the icons in the step of displaying the plurality of icons are icons predefined by a system, or customized by the user.

4. The method according to claim 1, wherein, the step of magnifying the second one of the matched icons further comprises the step of highlighting the second one of the matched icons.

5. The method according to claim 1, wherein, the magnifying step of magnifying the second one of the matched icons further comprises the step of determining and magnifying the second one of the matched icons that matches the tapped first one of the matched icons.

6. The method according to claim 5, wherein, the step of magnifying the second one of the matched icons further comprises the step of:
reading information from a configuration list in which the information includes a serial number of the first one of the matched icons, location of the first one of the matched icons, state of the first one of the matched icons and a serial number of the second one of the matched icons and displaying the first one of the matched icons on the screen by an unlocking program.

7. The method according to claim 1, wherein, the step of unlocking the touch screen further comprises the step of:
performing unlocking and clearing a plurality of recorded user tapping records by a touch screen device.

8. The method according to claim 1, wherein, the touch screen is brightened by an initial tap operation prior to the first tap operation.

9. A touch screen unlocking method, comprising the steps of:
displaying a plurality of icons including at least four icons on an unlocking interface, wherein each icon in the plurality of icons is visually identical to at least one other matched icon in the plurality of icons; and
where each pair of matched icons is visually distinct from each other and associated with a predefined function or application;
waiting for a user to tap a first icon of the plurality of icons;
after receiving a first tap operation of tapping the first icon from the user, magnifying and displaying a second icon of the plurality of icons, wherein the second icon is visually identical to the first icon;
unlocking the touch screen when a second tap operation of tapping the second icon is received from the user; and
starting the predefined function or application corresponding to the first icon.

10. The method according to claim 9, wherein the plurality of icons in the step of displaying the plurality of icons are distributed randomly on the unlocking interface.

11. The method according to claim 9, wherein, in the step of magnifying and displaying a second one of the matched icons a time of waiting for the second tap operation from the user is set as 10 seconds, 20 seconds or 30 seconds.

12. The method according to claim 9, wherein, the icons in the step of displaying the plurality of icons are ones predefined by a system, or customized by the user.

13. The method according to claim 9, wherein, the touch screen is brightened by an initial tap operation prior to the first tap operation.

14. A touch screen unlocking device,
wherein the device is configured to display a plurality of icons including at least four icons according to a configuration list which stores information comprising a serial number of a first icon, location of the first icon, state of the first icon and a serial number of a second icon matching the first icon, and wherein each of the plurality of icons is visually identical to at least one other matching icon in the plurality of icons; and
where each pair of matching icons is visually distinct from each other and associated with a predefined function;
wherein the touch screen unlocking device further includes an unlocking program, wherein when the first icon is tapped by a user, the unlocking program finds out a location and a state of the second icon and magnifies the second icon, and wherein a whole magnified area of the second icon is used as an area that receives a tap, and wherein the first icon is visually identical to the second icon;
when the second icon is tapped by the user, the unlocking program unlocks the touch screen and starting the predefined function.

15. The touch screen unlocking device according to claim 14, wherein, an editing operation of adding unlocking icons onto a lock screen interface by the user adds two matching icons to the configuration list.

16. The touch screen unlocking device according to claim 14, wherein, an operation of deleting unlocking icons on a lock screen interface by the user deletes two matching icons from the configuration list.

* * * * *